(12) United States Patent
Deng et al.

(10) Patent No.: US 10,715,593 B2
(45) Date of Patent: *Jul. 14, 2020

(54) METHOD AND APPARATUS FOR ESTABLISHING PEER-TO-PEER COMMUNICATION

(71) Applicant: InterDigital Patent Holdings, Inc., Wilmington, DE (US)

(72) Inventors: Tao Deng, Roslyn, NY (US); Ravikumar V Pragada, Warrington, PA (US); Eldad M Zeira, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,521

(22) Filed: Jul. 31, 2018

(65) Prior Publication Data

US 2018/0337986 A1    Nov. 22, 2018

Related U.S. Application Data

(63) Continuation of application No. 14/529,761, filed on Oct. 31, 2014, now Pat. No. 10,051,050, which is a
(Continued)

(51) Int. Cl.
*H04W 72/04* (2009.01)
*H04L 29/08* (2006.01)
(Continued)

(52) U.S. Cl.
CPC ........... *H04L 67/1078* (2013.01); *H04W 4/70* (2018.02); *H04W 8/005* (2013.01);
(Continued)

(58) Field of Classification Search
CPC . H04W 76/023; H04W 48/16; H04W 52/383; H04W 72/042; H04W 56/001;
(Continued)

(56) References Cited

U.S. PATENT DOCUMENTS

| 5,515,366 A | 5/1996 | Chieu et al. |
| 7,719,994 B2 | 5/2010 | Zumsteg |

(Continued)

FOREIGN PATENT DOCUMENTS

| CN | 101132617 | 2/2008 |
| EP | 0713345 | 5/1996 |

(Continued)

OTHER PUBLICATIONS

"English Language Abstract", Chinese Publication No. 101132617, dated Feb. 27, 2008, 1 page.
(Continued)

*Primary Examiner* — Lan-Huong Truong
(74) *Attorney, Agent, or Firm* — Yin Shao

(57) ABSTRACT

A method and apparatus for establishing peer-to-peer communication in a wireless network is described. A wireless transmit/receive unit (WTRU) may receive configuration information comprising periodic resources comprising time and subcarrier resources from a base station of a wireless network. The time and subcarrier resources may be used in discovery of other WTRUs. The WTRU is further configured to transmit an identification in the allocated resources and to transmit a synchronization signal to a peer WTRU for timing synchronization of the peer WTRU.

13 Claims, 9 Drawing Sheets

Related U.S. Application Data continuation of application No. 13/237,483, filed on Sep. 20, 2011, now Pat. No. 8,892,115.

(60) Provisional application No. 61/410,146, filed on Nov. 4, 2010, provisional application No. 61/448,941, filed on Mar. 3, 2011, provisional application No. 61/494,721, filed on Jun. 8, 2011.

(51) Int. Cl.
*H04W 8/00* (2009.01)
*H04W 4/70* (2018.01)
*H04W 76/14* (2018.01)
*H04W 56/00* (2009.01)

(52) U.S. Cl.
CPC ....... *H04W 56/001* (2013.01); *H04W 56/002* (2013.01); *H04W 72/042* (2013.01); *H04W 76/14* (2018.02)

(58) Field of Classification Search
CPC ... H04W 4/005; H04W 56/002; H04W 8/005; H04L 67/104; H04L 67/1078
See application file for complete search history.

(56) References Cited

U.S. PATENT DOCUMENTS

| | | | |
|---|---|---|---|
| 7,995,644 | B2 | 8/2011 | Sahinoglu et al. |
| 8,238,835 | B2 | 8/2012 | Nagai et al. |
| 8,554,200 | B2 | 10/2013 | Ribeiro et al. |
| 8,923,910 | B2 | 12/2014 | Wu et al. |
| 2002/0143855 | A1* | 10/2002 | Traversat .............. G06F 9/4416 709/202 |
| 2006/0168343 | A1 | 7/2006 | Ma et al. |
| 2007/0253400 | A1 | 11/2007 | Zumsteg et al. |
| 2008/0037496 | A1 | 2/2008 | Smith |
| 2008/0259896 | A1 | 10/2008 | Sahinoglu et al. |
| 2009/0016456 | A1* | 1/2009 | Li .......................... H04L 5/0007 375/260 |
| 2009/0017801 | A1 | 1/2009 | Laroia et al. |
| 2009/0217043 | A1 | 8/2009 | Metke et al. |
| 2009/0325625 | A1* | 12/2009 | Hugl ..................... H04W 52/16 455/522 |
| 2010/0009675 | A1 | 1/2010 | Wijting et al. |
| 2010/0110929 | A1 | 5/2010 | Li et al. |
| 2010/0110999 | A1* | 5/2010 | Li ....................... H04W 52/242 370/329 |
| 2010/0165882 | A1 | 7/2010 | Palanki et al. |
| 2010/0167743 | A1* | 7/2010 | Palanki ................. H04B 7/155 455/436 |
| 2010/0189048 | A1 | 7/2010 | Baker et al. |
| 2010/0191994 | A1 | 7/2010 | Nurminen et al. |
| 2010/0240312 | A1 | 9/2010 | Peng et al. |
| 2011/0086651 | A1* | 4/2011 | Li .......................... H04W 28/04 455/501 |
| 2011/0268006 | A1 | 11/2011 | Koskela et al. |
| 2011/0275382 | A1* | 11/2011 | Hakola ................. H04W 24/10 455/452.2 |
| 2011/0317569 | A1* | 12/2011 | Kneckt ............. H04W 74/0833 370/252 |
| 2012/0106517 | A1 | 5/2012 | Charbit et al. |
| 2012/0258664 | A1 | 10/2012 | Kinneberg et al. |

FOREIGN PATENT DOCUMENTS

| | | |
|---|---|---|
| EP | 1998499 | 12/2008 |
| JP | 2009-505060 | 2/2009 |
| JP | 2009-535625 | 10/2009 |
| JP | 2012-514435 | 6/2012 |
| JP | 2014502082 A | 1/2014 |
| JP | 2017501610 A | 1/2017 |
| TW | 200939824 | 9/2009 |
| WO | WO-2009/097039 | 8/2009 |
| WO | WO-2010/078271 | 7/2010 |
| WO | WO 2015065014 A1 | 5/2015 |

OTHER PUBLICATIONS

"English-Language Translation of First Notification of Office Action", Chinese Application No. 201610217695.8, dated Aug. 31, 2018, 8 pages.

"First Notification of Office Action", Chinese Application No. 201610217695.8, dated Aug. 31, 2018, 6 pages.

"IEEE Standard for Local and metropolitan area networks Part 16: Air Interface for Broadband Wireless Access Systems", IEEE Std. 802.16-2009, May 29, 2009.

"Korean Office Action", Korean Application No. 10-2013-7024071, dated Nov. 23, 2016, 5 pages.

"Korean Office Action (English translation)", Korean Application No. 10-2013-7024071, dated Nov. 23, 2016, 5 pages.

"United States Final Office Action", U.S. Appl. No. 14/529,761, dated Mar. 9, 2017, 14 pages.

"United States Office Action", U.S. Appl. No. 14/529,761, dated Jul. 13, 2017, 13 pages.

Hoang, et al., "HR-MS Discovers Network Infrastructure with Help from Forwarding HR-MS", IEEE 802.16 Broadband Wireless Access Working Group, IEEE C802. 16n-11/0142r1, Jul. 16, 2011, 15 pages.

Hoang, et al., "Text Proposal for Neighbor Discovery among Associated HR-MS", IEEE 802.16 Broadband Wireless Access Working Group, IEEE C802.16n-11/0141r2, Jul. 20, 2011, 7 pages.

Intel Corporation, "Resource Allocation for Mode-1 D2D Operation", 3GPP Tdoc R1-142872, 3GPP TSG RAN WG1 Meeting #78, Dresden, Germany, Aug. 18-24, 2014, 7 pages.

* cited by examiner

METHOD AND APPARATUS FOR ESTABLISHING PEER-TO-PEER COMMUNICATION

CROSS REFERENCE TO RELATED APPLICATIONS

This application is a continuation of U.S. Non-provisional application Ser. No. 14/529,761 filed Oct. 31, 2014, which is a continuation of U.S. Non-provisional application Ser. No. 13/237,483 filed Sep. 20, 2011, now U.S. Pat. No. 8,892,115, which claims the benefit of U.S. provisional application Nos. 61/494,721 filed Jun. 8, 2011, 61/448,941 filed Mar. 3, 2011 and 61/410,146 filed Nov. 4, 2010, the contents of which are hereby incorporated by reference herein.

BACKGROUND

In a cellular network, several states and corresponding behaviors may be defined for a plurality of wireless transmit/receive units (WTRUs) and a network including at least one base station (BS). In a disconnected mode, a WTRU may be aware of its rough geographical area and may notify the network of any change in the geographical area so that the network knows where the WTRU is to be paged. The WTRU may monitor for paging during the disconnected mode. In order to know its geographical area, the WTRU may need to recognize at least one cell in its immediate area, or search for other cells to obtain sufficient information to recognize its area.

When necessary, the WTRU may switch to a connected mode from the disconnected mode. In order to do so, the WTRU may identify the strongest cell in the area and receive the necessary information to determine its access mode. The WTRU may use a common (contention based) channel to access a cell. After some interactions, the WTRU may establish connections (service flows) as necessary in the connection mode. Once connections are established, the WTRU may have resources assigned to it and may request additional bandwidth as necessary.

It may be desirable for a WTRU to collaborate in the relaying of data to/from the network, or to communicate data locally without data flows to/from a base station. Various procedures are needed to support such collaboration by enabling the WTRU, possibly assisted by the network, to identify and maintain an association with at least one other WTRU.

SUMMARY

A method and apparatus for establishing peer-to-peer communication in a wireless network is described. A wireless transmit/receive unit (WTRU) may receive configuration information comprising periodic resources comprising time and subcarrier resources from a base station of a wireless network. The time and subcarrier resources may be used in discovery of other WTRUs. The WTRU is further configured to transmit an identification in the allocated resources and to transmit a synchronization signal to a peer WTRU for timing synchronization of the peer WTRU.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. A WTRU may be a non-infrastructure node.

When referred to hereafter, the terminology "seeking WTRU" includes but is not limited to a WTRU attempting to discover and associate with peers.

When referred to hereafter, the terminology "discoverable WTRU" includes but is not limited to a WTRU that may be discovered by the seeking WTRU.

When referred to hereafter, the terminology "base station" includes but is not limited to a Node-B, a site controller, an access point (AP), or any other type of interfacing device capable of operating in a wireless environment.

Figure 1A:
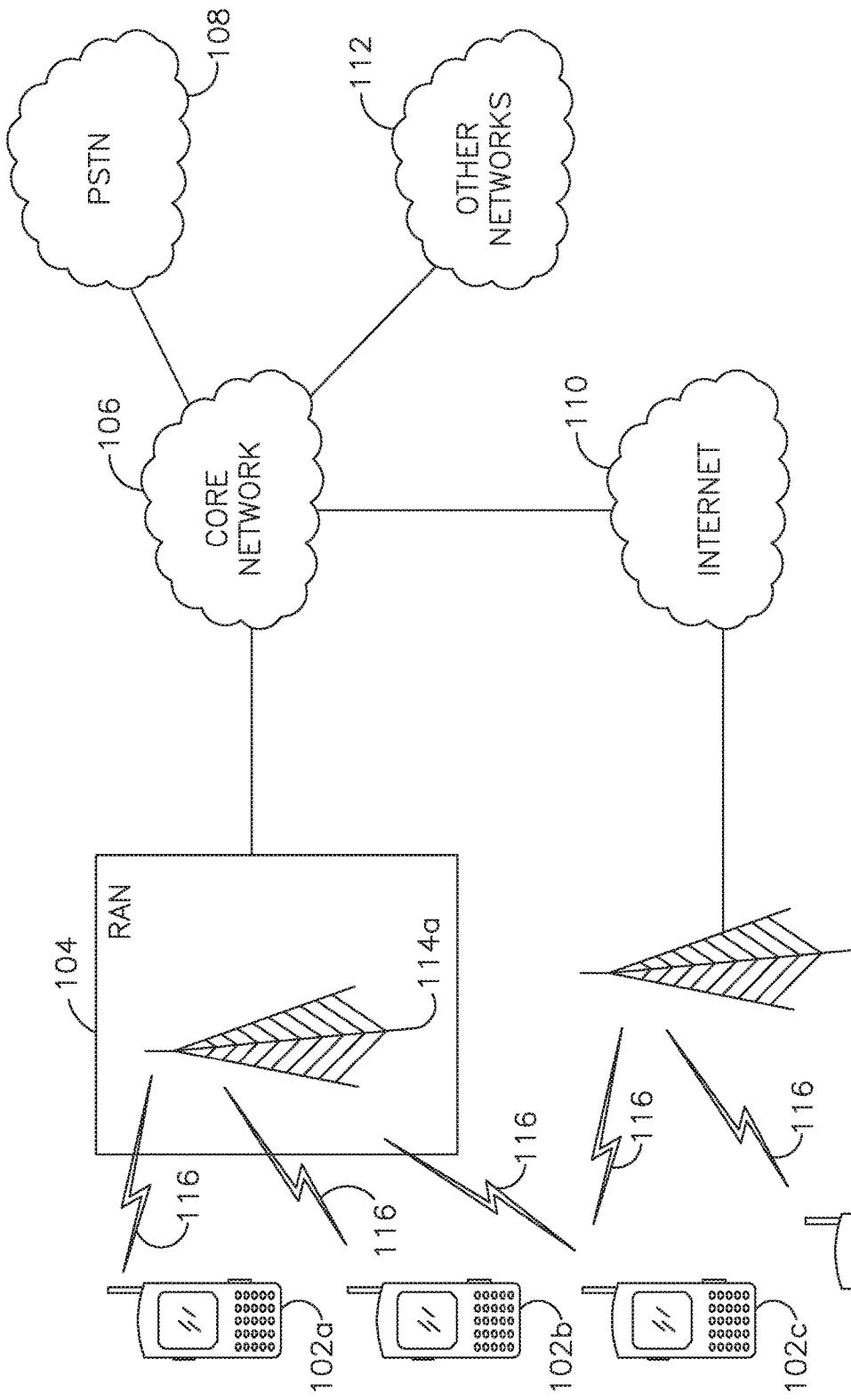
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations (BSs), networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink (DL) packet access (HSDPA) and/or high-speed uplink (UL) packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X , CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, prepaid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
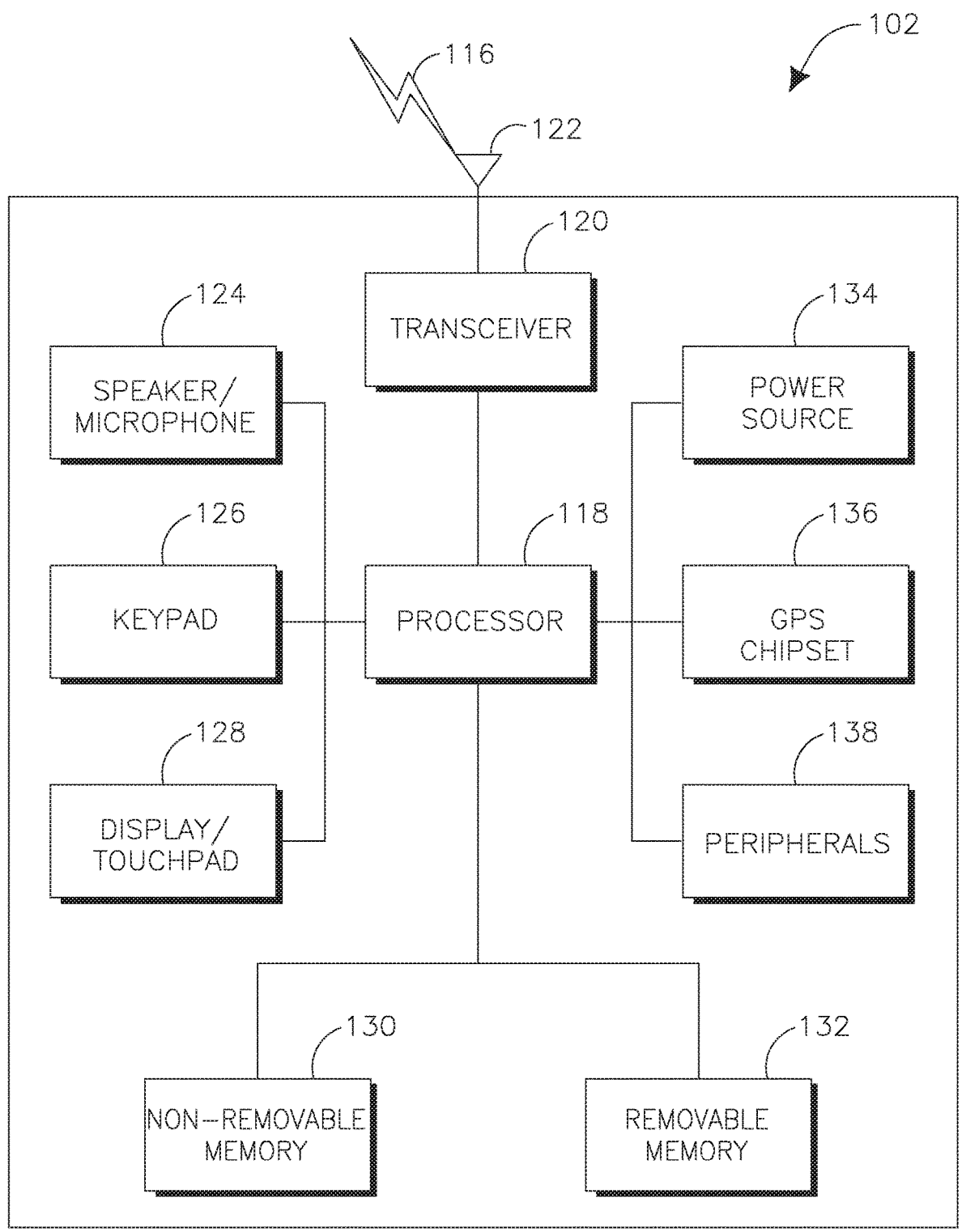
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
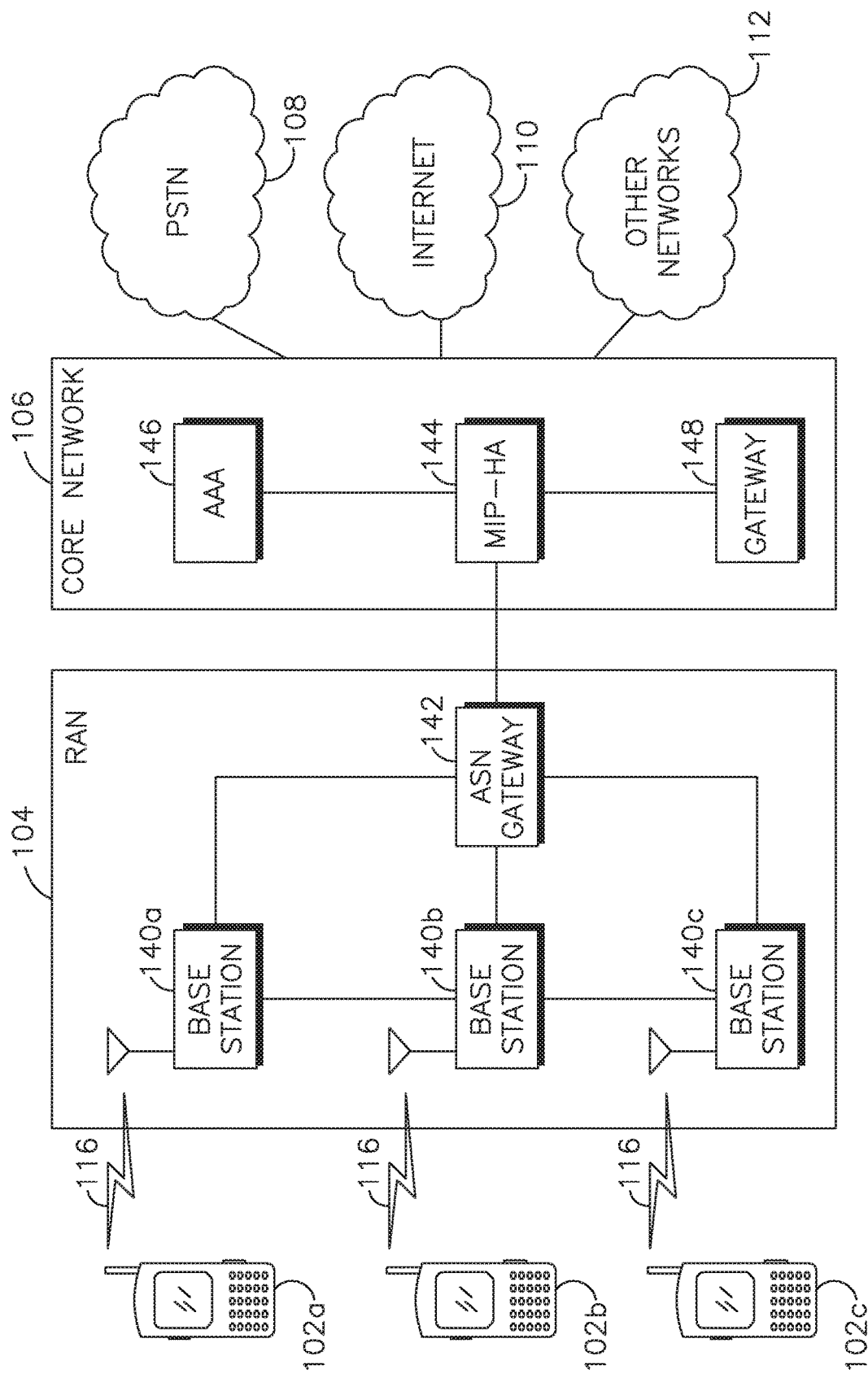
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. The RAN 104 may be an access service network (ASN) that employs IEEE 802.16 radio technology to communicate with the WTRUs 102a, 102b, 102c over the air interface 116.

As shown in FIG. 1C, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may implement the IEEE 802.16 specification. In addition, each of the WTRUs 102a, 102b, 102c may establish a logical interface (not shown) with the core network 106. The logical interface between the WTRUs 102a, 102b, 102c and the core network 106 may be used for authentication, authorization, IP host configuration management, and/or mobility management.

The communication link between each of the base stations 140a, 140b, 140c may include protocols for facilitating WTRU handovers and the transfer of data between base stations. The communication link between the base stations 140a, 140b, 140c and the ASN gateway 142 may include protocols for facilitating mobility management based on mobility events associated with each of the WTRUs 102a, 102b, 102c.

As shown in FIG. 1C, the RAN 104 may be connected to the core network 106. The communication link between the RAN 104 and the core network 106 may include protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA 144 may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the Internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1C, it will be appreciated that the RAN 104 may be connected to other ASNs and the core network 106 may be connected to other core networks. The communication link between the RAN 104 the other ASNs may include protocols for coordinating the mobility of the WTRUs 102a, 102b, 102c between the RAN 104 and the other ASNs. The communication link between the core network 106 and the other core networks may include protocols for facilitating interworking between home core networks and visited core networks.

Various non-traditional applications for cellular networks are being considered that involve communications not initiated by humans and not strictly hierarchical topologies, such as machine-to-machine (M2M) communications or machine type communications (MTC). The M2M communications or MTC are defined as communications initiated by a machine to communicate with either other machines or humans. The methods described herein may be applicable to MTC communications, as well as other types of communications.

Network topologies which include WTRU-to-WTRU direct communications, (also referred to as peer-to-peer communications), may be used for coverage extension, throughput improvement, and the like. These network topologies may also significantly increase network robustness by providing an alternative path for connectivity, by finding ("discovering") nodes when necessary. However, the WTRUs may not be mobile at all, or have a very low mobility.

Changes to the traditional behavior of a WTRU with respect to the way it finds and establishes a link with the network are necessary, including the functionality of node discovery, routing, association and bandwidth request, as appropriate. A WTRU, possibly assisted by the network, may apply to identify and maintain an association with a set of other WTRUs to either assist in relaying of data to/from the network, or communicate data locally without data flows to/from a base station. Client collaboration, relaying and WTRU-to-WTRU communication with or without a network may be implemented in any type of wireless communication systems including, but not limited to, IEEE 802.16 and any amendments thereof, long term evolution (LTE), universal mobile telecommunication system (UMTS), and the like.

Examples of peer-to-peer connections for machine type communications for some use cases are described herein. The node discovery and association may accommodate the following use cases, as an example: (1) M2M communications, (2) network robustness, and (3) throughput enhancement. There may be many different use cases and the examples disclosed herein may be applicable to any other use cases.

An example of the M2M communications case may be smart grid applications. It may be typified by low or no mobility, low sensitivity to latency and tight battery consumption requirements. For this application, in a typical node discovery scenario, one WTRU that cannot detect a base station in the area may attempt to discover and associate with other WTRU to act as relays on its behalf. Due to low mobility, the node discovery is a rare event.

An example of the network robustness case is a typical network that needs to recover from node failures, including failures of the infrastructure nodes. Such networks may be used for public protection and disaster recovery (PPDR), (also known as "first responders"), and in M2M applications (e.g., surveillance). In these networks, higher mobility may be required. The higher mobility results in a higher node discovery event rate. As in the M2M communications case, some of the devices may not have an access to the network, or network infrastructure nodes may not exist.

For the throughput enhancement case, both seeking WTRUs and discoverable WTRUs may communicate with the base station at some nominal data rate that is sufficient for the required control signaling. They may need to transmit and receive data at a much higher data rate, either between them or to and from the network.

Different use cases may require different node discovery and association mechanisms. Examples are disclosed for a framework that may accommodate all use cases.

The following are example goals of the design that are independent of the use cases: minimize impact on current standards, in particular physical layer; minimize interference created by signals (e.g., a preamble) necessary for the node discovery to preambles or other signals of infrastructure nodes or other WTRUs, minimize battery consumption, minimize latency, expedite discovery and association, share the network (infrastructure nodes and spectrum) with "normal" users, control of resources, improvement of system throughput by increasing reuse of radio resources, and the like.

An M2M communications case (as typified by Smart Grid) is described herein. This case may be typified by a large number of devices that are at low or no mobility. Data transmission may be generally infrequent and may tolerate relatively high latency. Data transmission may be event driven (e.g., power outage) and then requires tighter latency. Smart grid devices may share the network with other types of devices. Due to the characteristics above, network entry and re-entry may happen infrequently. Because of the large number of M2M devices in the network and the need to share it with other types of devices, interference created by the signals that are transmitted in order to be discovered may need to be minimized.

The WTRU-WTRU node discovery process may be performed when the device is powered up and the association established may be applicable without further updates due to the very low and no mobility. WTRUs associated with the network may be in a standby mode (i.e., "sleeping") most of the time to minimize battery consumption. Signals used for network access may cause as little interference as possible.

WTRU-WTRU interaction without infrastructure (public protection and disaster recovery (PPDR) applications) is described herein. This case may be typified by cellular mobility and by the absence of network infrastructure nodes. As communication is peer to peer, it may not be feasible to perform pairwise access for all pairs of mobiles in the network. Therefore, access may be done just prior to sending data. As a result, access may need to be quick. Battery consumption is important but perhaps not over the other goals. The WTRU-WTRU node discovery may be performed during the transition to the connected mode prior to the occurrence of peer-to-peer data communication, and in this sense may be considered event triggered.

WTRU-WTRU interaction under the control of a base station, (throughput enhancement (TE) and PPDR applications), is described herein. This case may be typified by mobility that is typical for cellular applications, by access of all WTRUs, (i.e., discoverable WTRUs and seeking WTRUs), and to infrastructure, (base station or relay station (RS)), nodes that may operate at a data rate that is sufficient for controlling signaling between them. Unlike the PPDR case, network access and setup precede data communication, and access latency requirements may not be as strict as for PPDR, (but stricter than for the M2M case). The WTRU-WTRU node discovery may be either event triggered or scheduled periodically by taking advantage of the central infrastructure node.

In one scenario, WTRU-WTRU direct communications, (e.g., peer-to-peer direct communications where the two WTRUs are the source and sink of the data), may be used for both PPDR and commercial applications, (e.g. direct video streaming). In another scenario, peer relaying at a data rate that is substantially higher than what is directly available from a base station may be used.

One of the constraints for network synchronization in an orthogonal frequency division multiplex (OFDM) communications system is that the OFDM system relies on time and frequency synchronized reception of waveforms from various transmitters in order for them to be separated. All available uplink (UL) signals in IEEE 802.16m may be received at the base station within the extended OFDM symbol (including cyclic prefix (CP)). For normal transmissions from the WTRU to the base station, this may not be an issue, as the WTRU may be synchronized at least in the downlink (DL) prior to any transmission. A device that does not have an access to the reference signal may not be synchronized in time or frequency. Signaling to the network may require trying many different times and possibly frequency offsets, in conjunction with power ramping. The process may cause a substantial delay and create a lot of interference, depending upon the type of signal used, (e.g., the delay and interference may be particularly severe for OFDM signals).

For M2M applications, as network discovery occurs rarely and does not need to be updated very often, the full functionality that is typically built into a relay in order to simplify access to it by a WTRU, (e.g., preamble, control channels, broadcast of full network information, and the like), may not be built into the WTRU. Doing so may unnecessarily drain battery powers and create a large amount of interference to other base stations. (This situation is not very different from Femto base station, except that the number of mobiles may far exceed the number of Femto base stations). In accordance with one example, associated devices may transmit little or no signals for that purpose. Those transmissions may be coordinated with the device sleep cycles.

In accordance with one example, a discoverable WTRU in an associated state may transmit using few resources at a low power. Unlike in a normal access, in the node discovery, the discoverable WTRU transmits and the seeking WTRU receives little or no information regarding the access parameters. The challenge is therefore to design a process by which such parameters are learned during the discovery and association procedure, and not broadcast, and yet provides a flexible access. In one example, interference created by signals transmitted by the discoverable WTRU is minimized by a group of WTRUs transmitting the same access information using the same resources at a low power level. Thus, a group-based preliminary access stage is followed by WTRU-specific access.

For WTRU-WTRU direct communications in the absence of infrastructure, as few steps as possible may be performed for quick and robust network access. Considering the (relatively) small number of devices and relaxed battery considerations (relative to M2M communications), regularly transmitted information may be more excessive without major impact on either interference or battery life. PPDR applications may support unicast (peer to peer) as well as multicast (peer to multiple peers) applications.

For WTRU-WTRU direct communications under control of a base station, it is assumed that both the seeking WTRU and the discoverable WTRU are attached to a base station, and therefore already roughly synchronized with each other, and the base station already knows of their existence and needs. The base station then needs to know the path loss, (i.e., quality of a radio link), between the seeking WTRU and the discoverable WTRU.

Figure 2:
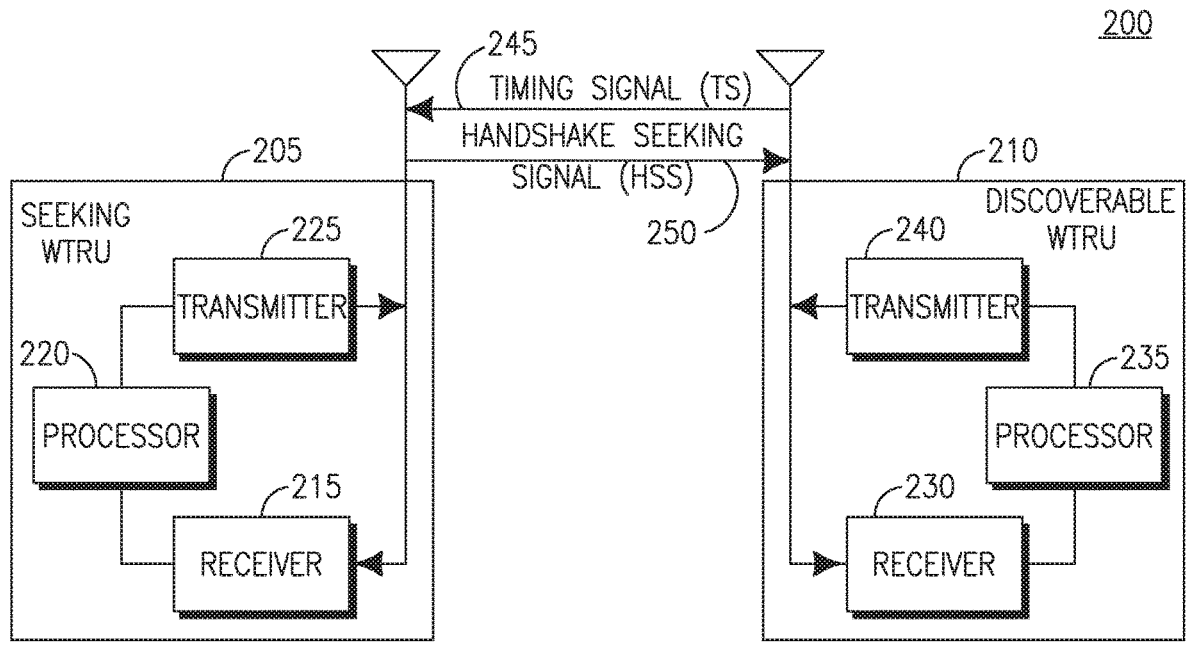
FIG. 2 shows an example network including a seeking WTRU and a discoverable WTRU configured to perform an access initialization procedure.

FIG. 2 shows a network 200 including a seeking WTRU 205 and a discoverable WTRU 210 configured to perform an access initialization procedure. The seeking WTRU 205 may include a receiver 215, a processor 220 and a transmitter 225.

The discoverable WTRU 210 may include a receiver 230, a processor 235 and a transmitter 240. The receiver 230 may be configured to receive a command signal from a base station (not shown) instructing the discoverable WTRU 210 to transmit a timing signal 245. The processor 235 may be configured to control the transmitter to 240 transmit the timing signal 245 in accordance with the command signal. The timing signal may include at least one of a primary preamble or a secondary preamble.

The receiver 215 in the seeking WTRU 205 may be configured to receive the timing signal 245 from the discoverable WTRU 210 and, in response, the processor 220 may be configured to control the transmitter 225 to transmit an HSS 250 to the discoverable WTRU 210. The receiver 230 in the discoverable WTRU 210 may be further configured to receive the HSS 250.

This procedure may apply, but is not limited to, M2M applications. It may be assumed that the discoverable WTRU 210 is already attached to a base station, but the seeking WTRU 205 is not. Initially, the seeking WTRU 205 may not have any information on the existence, timing, or parameters of any network in the area. The discoverable WTRU 210 may provide timing information to the seeking WTRU by transmitting (e.g., periodically) a timing signal (TS) 245. The TS 245 may be insensitive to the receiver timing. Thus, some waveforms may be received without any timing information but such information may still be determined. For example, any sequence that repeats itself in the time domain may be detected by continuously auto-correlating a time window against its lag. A primary advanced preamble (PA-preamble) may be used as the TS 245, which may provide at least one of its own timing information and system bandwidth information. If additional information needs to be provided (for example group membership), the TS 245 may include a PA-preamble and a secondary advanced preamble (SA-preamble), whereby the SA-preamble is mapped to the group. The PA-Preamble may convey system bandwidth by sequence. The SA-preamble may convey a cell-ID or a WTRU-ID.

The discoverable WTRU 210 may transition between an idle mode/state or a connected mode/state, and it may be assigned a sleep pattern that makes it unavailable at certain predetermined time periods. When the discoverable WTRU 210 is in an idle mode/state, it may be preconfigured to wake up in order to be able to be discovered by a potential seeking WTRU, such as seeking WTRU 205. The wakeup epochs may coincide with those meant to receive paging. When the discoverable WTRU 210 is in a connected mode/state, it may be in a sleep, (i.e., a discontinuous reception (DRX)), pattern. Thus, any such sleep pattern may be synchronized by the WTRU 210 such that its "awake" epochs are sufficient to be discovered and, if it is a part of a group, the WTRUs of the group may be synchronized to wake at same time. The timing and length of wakeup periods for discovery may be independent of any other sleep pattern configured for other purposes.

Multiple discoverable WTRUs 210 may transmit the same TS 245 at the same time on the same resources. A receiver may interpret such a waveform as a single transmission with a multi-path. Due to the short propagation time, this may not be an issue. The advantage of multiple discoverable WTRUs 210 transmitting the same signal, (i.e., TS 245), is that the signals received from multiple sources are summed constructively rather than interfering with each other. As a result, the transmission power may be reduced.

There may be two scenarios for the timing of the TS 245. In one scenario, discoverable WTRUs in a peer group may transmit the same waveform at the same time. In an alternate scenario, different peer groups may transmit a different TS 245, either at the same time or at different times. The benefit of transmitting the same waveform may be the reduction of the transmission power of the TS 245. Alternatively, or additionally, each discoverable WTRU 210 may transmit the TS 245 at different times. This may be beneficial when there is a large number of potential discoverable WTRUs 210, by reducing the average discovery time.

The transmission epoch may be periodic or randomized. In the latter case, the discoverable WTRU 210 may determine its own transmission epochs. For example, these may be determined when the discoverable WTRU 210 is in a DRX or sleep states. For both variants, the discoverable WTRU 210 may not receive, (e.g., a base station preamble), and transmit, (e.g., a TS 245), at the same time.

A base station (not shown) in the network 200 of FIG. 2 may instruct the discoverable WTRU 210 which TS to transmit, when to transmit it, at what power level to transmit it, and/or which sub-carriers may carry the TS sequence. The periodicity of such transmissions, (i.e., the distribution of time intervals between transmissions), may affect the network entry time and/or battery consumption of the discoverable WTRU 210. When the discoverable WTRU 210 is attached to a network indirectly, the instruction may be relayed, (through relays or through other WTRUs).

The length and frequency of transmission of the TS 245, (whether periodic or not), may play a major impact on WTRU-WTRU discovery success rate, its latency, tolerance to WTRU mobility, interference overhead and battery consumption. Since the seeking WTRU 205 is not associated with the network, it may be neither synchronized with the network nor with the discoverable WTRU 210. As a result, it may not be possible for the seeking WTRU 205 to align the time line properly to receive the TS 245 in accordance with the TS transmission schedule. In order to receive the TS 245, the seeking WTRU 205 may attempt to continuously receive each symbol at least over one predefined longest TS transmission period, (the sub-carrier configuration of the TS 245 may also be predefined and thus known to the seeking WTRU 210). The seeking WTRU 205 may attempt to receive the TS 245 according to an arbitrary predetermined schedule that, combined with the predetermined TS transmission schedule, may generate a satisfactory probability of that seeking WTRU 205 reception coinciding with the discoverable WTRU 210 transmission in time domain. This may be possible because, as with randomized TS epochs, the probability of reception may depend on the cumulative open window time, and not its exact timing.

If the seeking WTRU 205 does not receive the TS 245, it may wait and try again. The wait time, number of attempts and failure criteria may be configured at the seeking WTRU 205 as desired. Upon receiving the TS 245, the seeking WTRU 205 may acquire the following information: network timing, (the IEEE 802.16m PA-preamble provides symbol, frame and sub-frame timing), system bandwidth (depending on the TS 245, true for use of the IEEE 802.16m PA-preamble), the cell identity and type the discoverable WTRU 210 is associated with, (if using the IEEE 802.16 PA/SA-preamble), path loss (i.e., link quality) information, (if the TS 245 transmit power level is fixed and predefined), peer group identity for the seeking WTRU 205 to determine whether a response is warranted, (if peer group information is embedded in the TS 245 sequence), or the like.

At this point, the network 200 or the discoverable WTRU 210 does not know the existence of the seeking WTRU 205. Therefore, as shown in FIG. 2, the seeking WTRU 205 may transmit a handshake seeking signal (HSS) 250 indicating, as a minimum, its presence. The discoverable WTRU 210 may monitor for such an HSS 250 after sending the TS 245. Listening resources may be predefined and the mapping may be known to the seeking WTRU 205, or determined from signals received by the seeking WTRU 205 from the discoverable WTRU 210, (e.g., the type of TS). The nature of the listening resources depends on the information and waveform used by the seeking WTRU 205. In accordance with one example, the waveform may be a simple time domain waveform. In this case, the listening resources may be a listening window or windows at predetermined times relative to the TS 245 and/or the sub-carriers applied for the seeking WTRU 205 transmission. In the absence of a seeking WTRU 205, the added interference in the network 200 may be an infrequent transmission of a very short waveform, followed by several (similarly short) listening windows. Thus, the interference created by the signals (TS 245) for assisting the neighbor discovery process may be minimal.

The seeking WTRU 205 may transmit a waveform, (e.g., HSS 250 in FIG. 2), to make itself known to the discoverable WTRU 210 and/or the network 200, (also referred to as "initial handshake"). In order to minimize the interference, the seeking WTRU 205 may transmit the HSS 250 once, or start transmission of the HSS 250 at a low power and ramp up the transmission power during the listening windows, until a response is received or an allowed maximum power is reached, in which case ramping has failed. Ramping may be used by the discoverable WTRU 210 for estimating path loss, (i.e., the quality of a radio link established between the seeking WTRU 205 and the discoverable WTRU 210). Even if not necessary for path loss estimation, ramping may have benefits in reducing unnecessary interference.

The seeking WTRU 205 may determine which discoverable WTRUs 210 to respond to. The seeking WTRU 205 may send an HSS 250 in response to a TS 245 from an allowed peer group. In this case, the mapping of the peer group to signals sent from the base station, (e.g., TS 245), may be known in advance, (e.g., hard coded). The initial power level, a preamble interval, and the power ramping steps may be predetermined. With the listening windows, the discoverable WTRU 210 may know how many ramping steps have occurred.

The discoverable WTRU 210 may estimate, for example, the path loss, (i.e., radio link quality), between the discoverable WTRU 210 and the seeking WTRU 205, and may report the estimate to a base station (not shown) in the network 200. To ensure that an appropriate threshold is used, the base station may instruct the discoverable WTRU 210 to report all received signals, or statistics, (such as average and spread), derived from such signals, whether they exceed the threshold or not, such that the threshold may be adjusted if necessary. With the knowledge of the ramp-up step size and the initial power, the discoverable WTRU 210 may determine the transmission power and may estimate the path loss. Alternatively, no ramping may be performed and the HSS 250 power may be fixed and known. For example, the power level of the HSS 250 may be the same as the TS 245 power level. HSS resources may be given in terms of the TS 245, (e.g., using fixed resources every n-th frame starting a given time after the TS 245).

Examples of an HSS in IEEE 802.16m may be a PA-preamble (same as the TS 245), the IEEE 802.16m ranging preambles (either for synchronized or non-synchronized devices), and/or an IEEE 802.16m sounding signal. Since the seeking WTRU 205 may now be roughly synchronized with the discoverable WTRU 210, the HSS 250 may not need to be self-synchronizing. The resources for the sounding as HSS 250 may be implicitly allocated by a base station through the allocation of TS transmission epochs. The base station may clear those times from sounding by other devices. For example, for TDD, the first OFDMA symbol in the second UL sub-frame in the frame which contained the TS 245 may be reserved for the HSS 250. If ramping is used, then subsequent epochs may be assigned. The identity (ID) or timing of the HSS 250 may be determined based on the TS 245 that was received. Specifically, if a group ID is used for the TS 245, then same group ID may be used. If the TS of different peer groups transmit at different times or sub-carriers, then the HSS 250 may carry the group information implicitly. This allows the HSS 250 to carry the path loss information as measured at the seeking WTRU 205. For example, if the IEEE 802.16m PA-preamble and/or SA-preamble are used for the HSS 250, then the SA-preamble may be mapped to the received signal level.

Not necessarily all discoverable WTRUs 210 that have received the HSS 250 need to respond. A determination of who responds may be based on relevant information, (e.g., estimated path loss), and may be made in a distributed manner or under direct base station control. Specifically, the seeking WTRU-discoverable WTRU 205/210 path loss estimate may be obtained as explained above, and a seeking WTRU-base station path loss estimate, obtained in the usual manner, may be used to determine the best discoverable WTRU 210. In a centralized control mode, discoverable WTRUs 210 which have received the HSS 250 may send that information to the base station, and the base station may decide which should respond based on the information, (e.g., path loss estimate and other parameters such as capabilities of the forwarding WTRU, its battery level, and/or its own traffic load). To reduce the signaling load between the discoverable WTRU 210 and the base station, it is possible to limit that signal to discoverable WTRUs 210 that obtain a low enough path loss estimate.

The centralized control mode may introduce a latency in responding to the ramping and, as a result, may cause extra battery consumption by the seeking WTRU 205, and possibly a failed hand-shaking effort, because the discoverable WTRU 210 may not respond to the ramping upon receiving it, and may send the information to the central node and await instructions in return. During this round-trip delay, the HSS 250 ramping may still be on-going.

Alternatively, the responding discoverable WTRU 210 may be controlled in a distributed manner by predetermining a threshold based on at least one radio link quality (e.g., path loss) value. The threshold may be signaled by the base station, hard wired or unspecified. Traffic load may be taken into account in a similar manner, (e.g., by a threshold on buffer occupancy). Note that the distributed procedure doesn't guarantee that at least one discoverable WTRU 210 may respond. Any discoverable WTRU 210 that receives the TS 245 may send that information to the base station. The base station may adjust the response parameters and signal it to the discoverable WTRU 210, and/or the seeking WTRU 205 may try again after some predetermined time period elapses. The transmission power for the discoverable WTRU 210 at this stage may be determined from the radio link quality estimate.

The network 200 in FIG. 2 may support the transmission of broadcast information by the discoverable WTRU 210. The benefit may be in preventing the constant broadcast of full access information when, most of the time, access information is not required. Instead, reduced transmission, (e.g., limited to a synchronization signal), may be transmitted. The transmission of the TS 245 and HSS 250 may serve as a first phase in causing suitable discoverable WTRUs 210 to transmit discoverable WTRU-specific and sufficient access information that fulfills the same functions as base station timing and broadcast signals.

Given the short range to forwarding WTRU and low mobility, it may be assumed that the first phase, (i.e., the exchange of the TS 245 and the HSS 250 between two WTRUs), may achieve sufficient synchronization, and additional synchronization steps may not be necessary. However, if additional synchronization steps are necessary, they may be carried out in a normal manner.

Figure 3A:
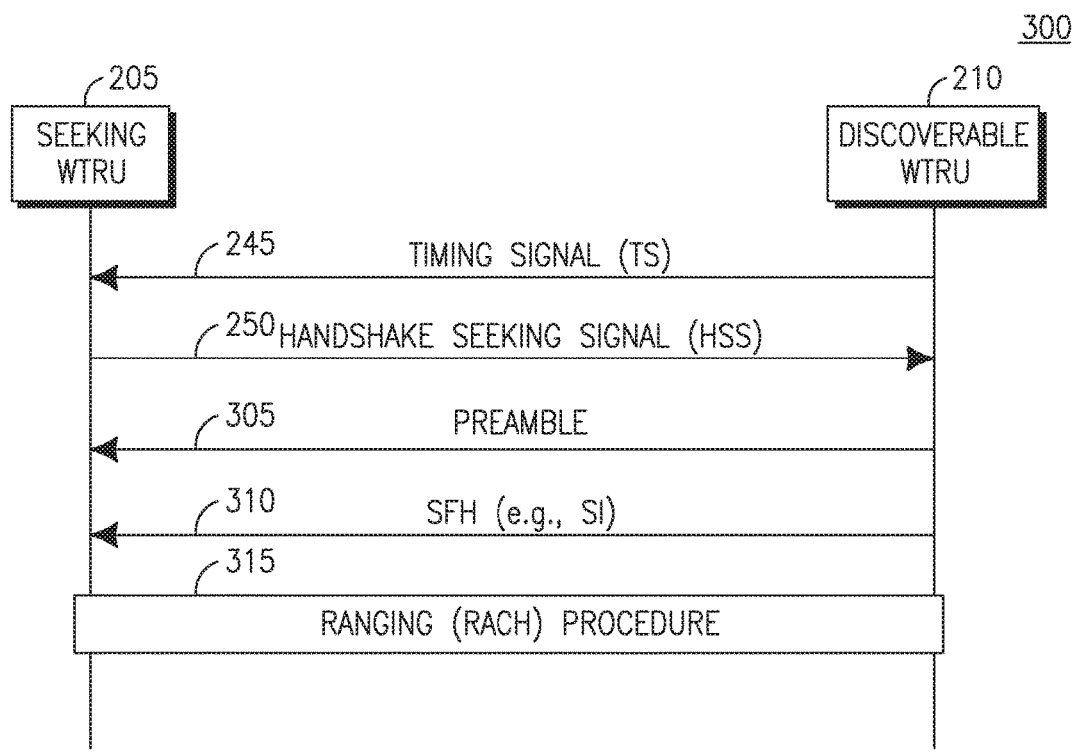
FIGS. 3A and 3B are flow diagrams of procedures used to achieve sufficient synchronization between a seeking WTRU and a discoverable WTRU.
Figure 3B:
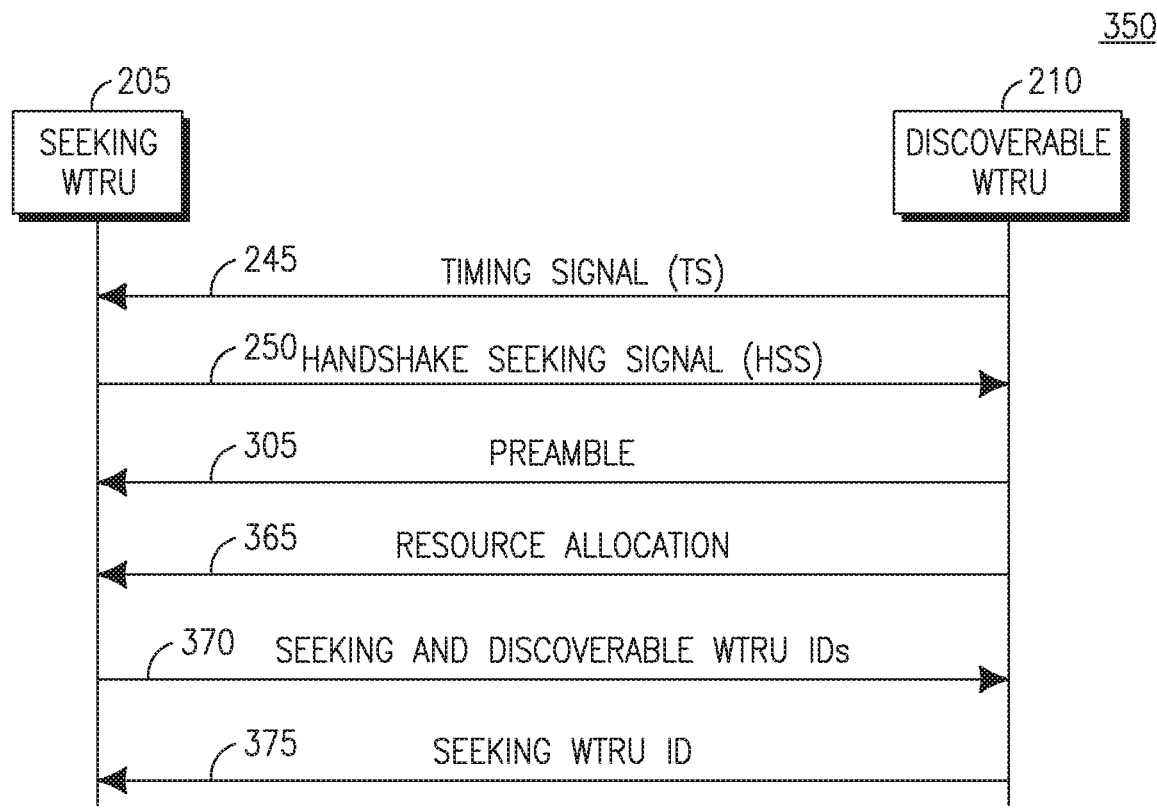

FIGS. 3A and 3B are flow diagrams of additional procedures 300 and 350, which may include the steps described above, to complete the access to the discoverable WTRU.

In the procedure 300 of FIG. 3A, after completing the first phase, the discoverable WTRU 210 may transmit an identification signal 305 that includes a WTRU identity (ID) (i.e., a preamble) that may be temporary (i.e., meaningful within a cell). Given that bandwidth and timing information are already available, there may not be any need to transmit a PA-preamble. Instead, an SA-preamble may uniquely identify the discoverable WTRU 210. The short duration of this signal makes it suitable to stop the power ramping of the HSS 250, but other signals may also be used for this purpose.

Once the HSS 250 is terminated in response to the successful reception of the response 305 of the discoverable WTRU 210, the seeking WTRU 205 may prepare to receive the broadcast information of the discoverable WTRU 210 at a predefined time instance and sub-carrier locations. Alternatively or additionally, the discoverable WTRU 210 may then transmit sufficient access information, (e.g., system information (SI)) that the seeking WTRU 205 may use to derive where to access the broadcast information. The access from the seeking WTRU 205 may be performed through the use of a common channel or a dedicated channel. The use of a dedicated channel may be suitable for low probability of collision of network access attempts, while the use of a common channel may be suitable for higher collision probability. In both alternatives, the information may include the ID of the discoverable WTRU 210.

With the use of common channels as shown in the procedure 300 of FIG. 3A, the discoverable WTRU 210 may transmit, for example, a WTRU-specific PA-preamble and SA-preamble (305), and/or a primary and secondary superframe header (SFH) (310) with sufficient content (i.e., minimal content) to allow access to the seeking WTRU 205. When receiving the SFH, the seeking WTRU 205 may know the common channel ("ranging") access parameters and may perform, for example, a ranging procedure via a random access channel (RACH) (315), whereby a preamble is sent from a WTRU to a base station, is ramped up, and there is a response and bandwidth allocation by which the WTRU may send back some information. It may not be required that the preamble ID matches the TS 245, as long as the preamble ID is a "legitimate" ID.

Either a preamble 305 followed by an SFH 310 or its equivalent, (i.e., any message that contains access information), or an SFH 310 without a preamble 305, may be transmitted. The first of those may be at a known location relative to the HSS location and/or its type. The seeking WTRU 205, having sent an HSS 250, may need to know where to look for the response. Thus, for example, the response may be sent a given number of sub-frame or frames after the HSS 250. Additionally, the timing of the response may depend on the choice of sequence for the HSS 250, (e.g., different sequences may lead to different delays between the HSS 250 and the response). The SFH resources may be partially determinable from the preamble 305. The SFH or its equivalent may have an embedded ID. If a secondary preamble is used that has an ID mapped to it, then it may use the same ID as in the SFH.

There may be several ways to assign IDs. In one embodiment, the ID may be a unique ID assigned to every WTRU. If this is the case, there may be more IDs than may be supported by the preamble alone. The ID information in the SFH 310 may be used instead. Alternatively, the ID may be concatenated with the ID implied by the preamble (if used).

In another embodiment, the ID may be randomly chosen by the discoverable WTRU 210. It is possible that two or more discoverable WTRUs 210 may choose the same ID. If that happens and the resources for ranging are the same, then the seeking WTRU 205 may effectively send ranging to both of the discoverable WTRUs, which may create a collision when they respond. To resolve it, each discoverable WTRU 210 may include its random ID, plus a second random ID to be concatenated with it. Then, the seeking WTRU 205 may not decode the response and may ramp up and resend its HSS250, or the seeking WTRU 205 may decode one response and include the concatenated ID in a further transaction. The discoverable WTRU 210 with that ID may continue to respond.

With the use of dedicated channels as shown in the procedure 350 of FIG. 3B, the SFH transmission may be skipped and a resource allocation 365 including specific UL resources may be signaled directly to the seeking WTRU 205. Other parameters, (e.g., multiple-input multiple-output (MIMO) mode), may also be signaled. The access information may be transmitted on an SFH-like waveform. The resources for its transmission may be predetermined.

To resolve conflicts, the seeking WTRU 205 may access a discoverable WTRU 210 that has sent a response 370 that may include the ID of the seeking WTRU 205 and the discoverable WTRU 210. The discoverable WTRU 210 may acknowledge the response 370 by sending the ID of the seeking WTRU 205 (375). Other data may be added.

To prevent downlink interference between the SFH or A-MAP (i.e., mapping) transmission of two or more discoverable WTRUs 210, transmission time of the SFH or A-MAP may be chosen randomly following the SA-preamble. The resources used for SFH or resource allocation may be determined from the preamble or may be predetermined.

If no response to the HSS has been received after a given number of ramping steps, (or alternatively at maximum power), the seeking WTRU may stop the access procedure and try again after some random back-off time. If no response is received, depending on the type of channel used, the seeking WTRU may re-start the transmission of the HSS after some random back-off time, or may try ranging again after some random back-off time in the normal manner.

In another embodiment, the TS may carry a group ID of a plurality of discoverable WTRUs that is potentially different from a cell ID. This may be particularly useful where there are many groups, and discovery time is to be kept short.

Figure 4:
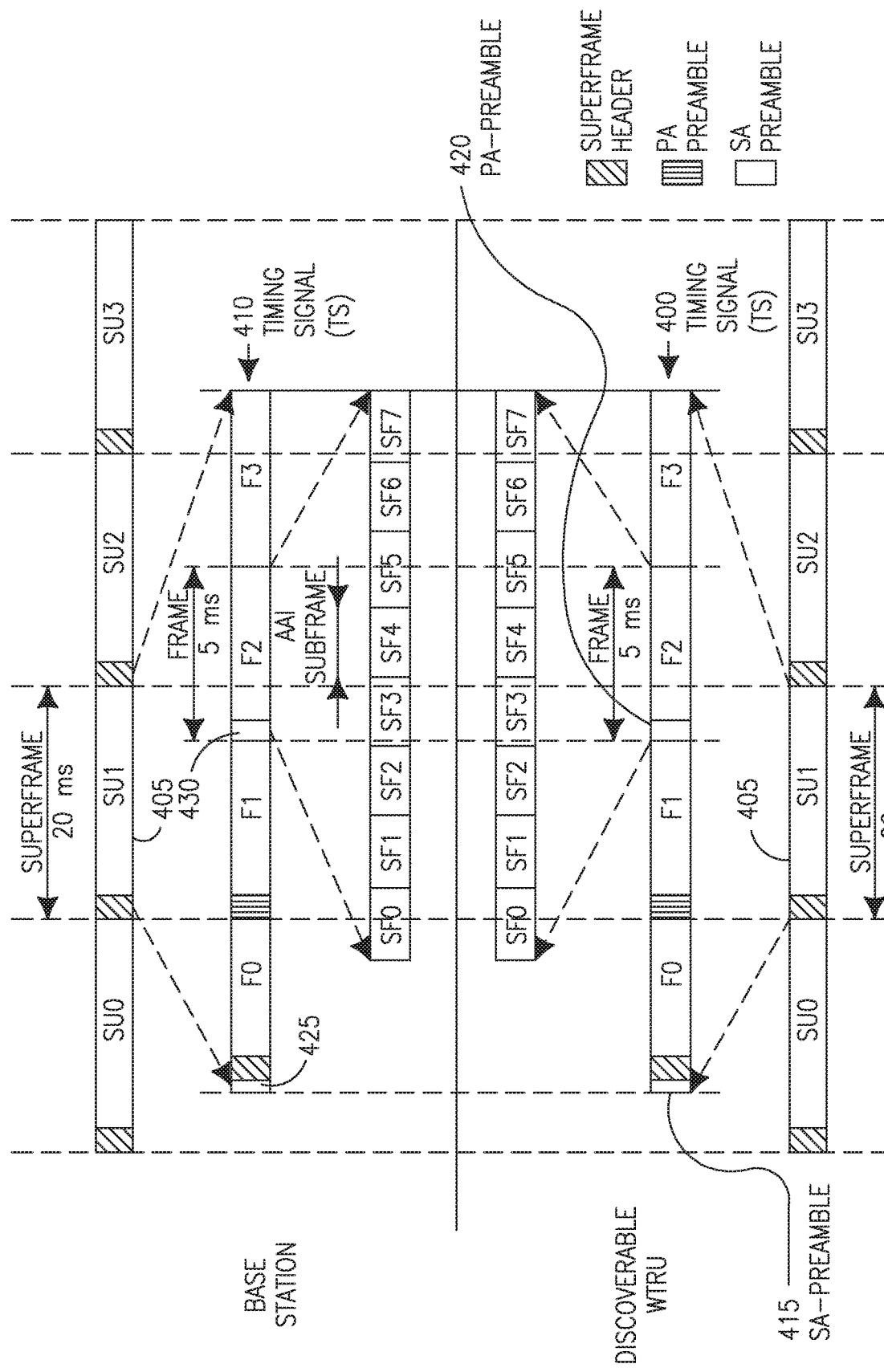
FIG. 4 shows an example of placement of a timing signal (TS) in a superframe.

FIG. 4 shows an example placement of a TS 400 transmitted by a discoverable WTRU in an IEEE 802.16m superframe 405. A base station transmits a TS 410. The TS 400 sent by the discoverable WTRU may include an SA-preamble 415 and a PA-preamble 420. In this example, the TS sent by the base station may include an SA-preamble 425 and a PA-preamble 430, which coincide with the preambles 415 and 420 of the TS 400 sent by the discoverable WTRU.

The TS 400 may be transmitted in a downlink (DL) access zone where discoverable WTRUs are set to transmit while the seeking WTRU is receiving. However, no additional transmit/receive (i.e., switching) gaps are necessary due to the TS 400.

The TS 400 may not have to be transmitted every superframe. To depict its placement, a superframe may be denoted without a TS as "0", super-frames that contain a TS of group "A" as "A", and superframes that contain a TS of group B as "B". Thus, as an example, a periodic, single group may be depicted by A0000000A0000000A0000000A . . . ; a periodic, 2 groups may be depicted as A0B00000A0B00000A0B00000A . . . ; and a randomized, single group may be depicted as A00A0000000000000AA000000A . . . .

Figure 5:
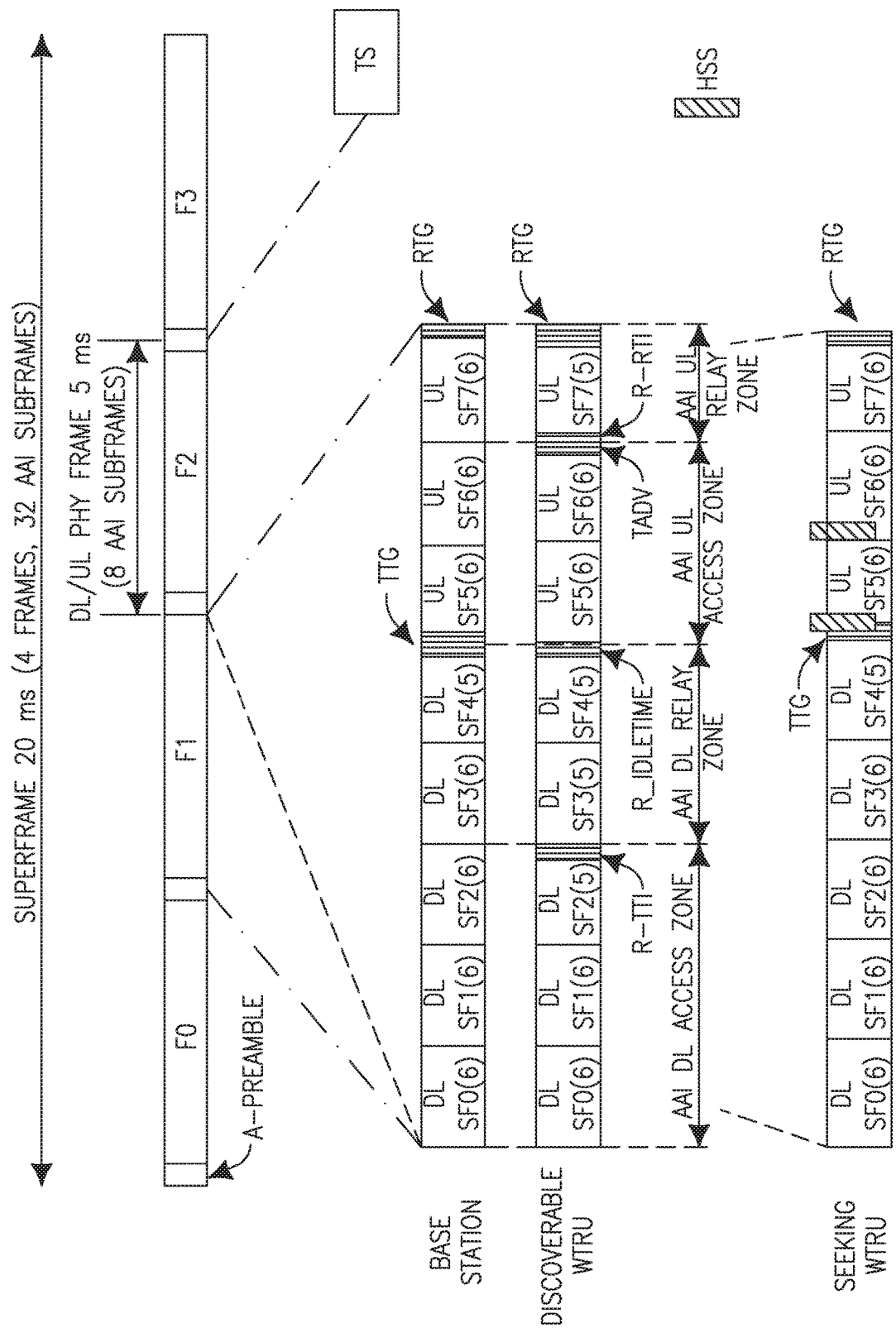
FIG. 5 shows an example of transmission opportunities for sounding as an handshake seeking signal (HSS) in a time division duplex (TDD) frame.

FIG. 5 shows an example of transmission opportunities for sounding as HSS in a TDD frame. An HSS may use a sounding signal. HSS timing and code combination may correspond uniquely to a TS code that, in itself, corresponds to a discoverable WTRUs group ID. The HSS may be sent during normal sounding transmission epochs of the access zone, (i.e., first OFDMA symbols of the sub-frames of the access zone). HSS may be transmitted in the UL access zone, therefore no additional transmit/receive gaps may be necessary. Path loss information may not be encoded into the HSS.

Figure 6:
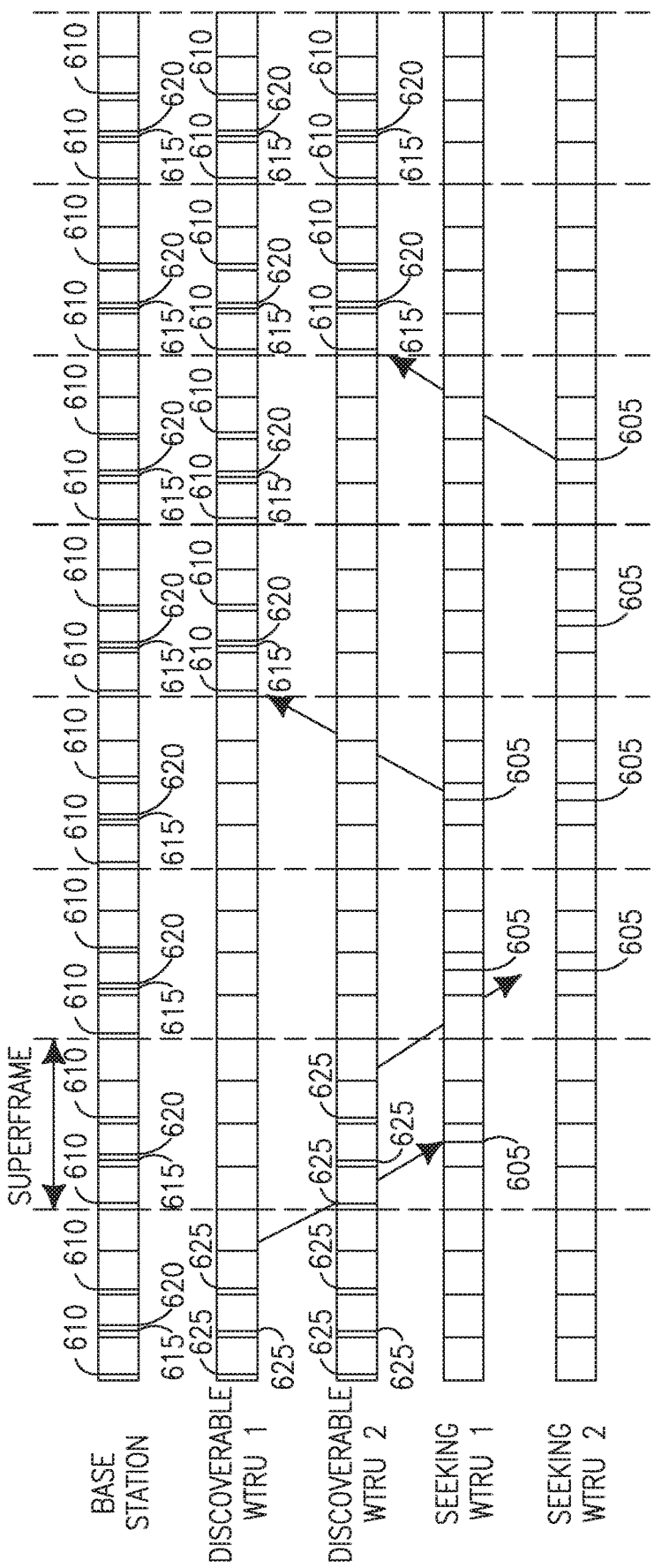
FIG. 6 shows an example of a plurality of superframes used by a base station, two discoverable WTRUs and two seeking WTRUs.

FIG. 6 shows an example of a plurality of superframes used by a base station, two discoverable WTRUs and two seeking WTRUs. The superframes may include HSSs 605, SA-preambles 610, PA-preambles 615, SFHs 620 and TSs 625. In this example, a discoverable WTRU 1 and a discoverable WTRU 2 may not initially transmit an SFH, as they may not support any attached devices. However, the discoverable WTRU 1 and the discoverable WTRU 2 may transmit a TS with different codes. Upon satisfying group and potentially path loss requirements, a seeking WTRU 1 and a seeking WTRU 2 may respond with the ramping up of an HSS (of different codes). When the HSS is received, the discoverable WTRU 1 and the discoverable WTRU 2 may respond by transmitting an SFH and both SA-preamble instances. The SFH may be protected by a cyclic redundancy check (CRC). Therefore, a legitimate SFH may be easy to identify from other data. At this point, discoverable WTRU operation may be identical to relay signaling, and the seeking WTRU may perform network entry as usual.

The discoverable WTRUs that are not associated with any seeking WTRUs may not create any interference to the base station SFH, nor do they consume battery power to transmit it. (In IEEE 802.16m, an SFH may consume 5 OFDMA symbols in each superframe, which may be considered equivalent to discoverable WTRUs transmitting roughly 2.5% of the time).

In another example, a TS code may not carry any ID, (i.e., all discoverable WTRUs may be discovered by all seeking WTRUs). This procedure may be useful when seeking WTRUs are few, and attachments are far between, so it is important to minimize TS energy and interference. As previously described, a TS may include a PA-preamble. Its transmission, when not in a sleep mode, may coincide with the base station PA-preamble. The PA-preamble code may identify it as a discoverable WTRU, (rather than a base station).

A seeking WTRU may respond with an HSS, (possibly if path loss criteria are met). Several seeking WTRUs may respond at the same time using the same sounding code. The HSS may carry the seeking WTRU group or device ID. Upon reception of the HSS, (ID and path loss criteria are met), the discoverable WTRUs may start to transmit an SA-Preamble and SFH. Seeking WTRUs may start network entry procedures.

In another embodiment, both discoverable and seeking WTRUs may be under the control of a base station. This may be most suitable (but not limited to) throughput enhancements in high data rate applications, e.g., streaming videos. This embodiment may be applicable to peer-to-peer data communication and/or peer relaying for high data rate.

There are several alternatives for this case which may depend on the information the network may have prior to initiation of the discovery. The information may relate to the specificity of the subject of the discovery and with path loss. The WTRUs may not know in advance which other WTRUs they want to be connected to. This may be useful in peer-to-peer data communications in the context of social networking or other applications where the peer-to-peer communication takes place between peers that happen to be in the area. It may also be useful when attempting to discover any peer relay which happens to be in the area. In this scenario, a seeking WTRU may want to find discoverable WTRUs that are within sufficiently short range for peer-to-peer communication. Alternatively or additionally, two WTRUs may seek each other, e.g., to augment the data rate they may support through the base station.

In any scenario, it may be helpful if the base station has information regarding the physical location of the WTRUs. Such information may be obtained by GPS, by beamforming performed at the base station, by timing advance correction, by location measured at the WTRU, (e.g., time difference of arrival (TDOA)), or any combination thereof. It may be assumed that physical proximity as determined from such location information may predict peer-to-peer path loss. (This is clearly not the case, for example, for two WTRUs that are located on different floors in the same building). If both assumptions are assumed to be met, then it may be useful for the base station to construct a proximity map for WTRUs in its area that predicts the economy of the connection (in resources, latency, and the like) relative to communication through the base station. It may be up to the base station to keep its location information updated. Thus, for example, if WTRUs in idle state are to remain discoverable, then they may be scheduled to update their location information as necessary.

If a prior path loss estimate exists, the base station may instruct the discoverable WTRUs to transmit a signal that may be detected by seeking WTRUs in the cell. The seeking WTRUs may include one or more WTRUs in a particular proximity group. They may be notified of the discovery attempt and necessary configuration of the discovery process. Even if proximity information isn't available, the procedure has a built-in path loss measurement that may be used by the network to assign de-facto proximity.

A reference signal that may be similar to a TS may be used to enable other WTRUs to measure path loss between them. Transmission power may be indicated by the network or base station. For example, the base station may instruct a WTRU to raise its power if other WTRUs in the area have failed to receive it. Alternatively or additionally, the transmission power may be predefined. Either effectively defines the discovery range and enables the path loss derivation once the TS transmission is detected and received. The latter may reduce the overhead in connection with the discovery process.

In a variant of this procedure, TS power may be stepped (ramped) up in predetermined steps such that the transmission power at any given time is known and may be used for a path loss (PL) estimate. Transmission time and/or frequency may be indicated by the network or base station and provided to the WTRUs that need to receive it. Groups of users may be separated in time and/or frequency or code. Also, the frequency resource may be predefined to reduce overhead.

For this procedure, it may be assumed that both discoverable WTRUs and seeking WTRUs are in a connected mode at the time of discovery and not in a sleep mode. It may be the base station's responsibility to make sure that the sleep patterns (if any) of the WTRUs are matched. User or group identity may be encoded similar to encoding of user group ID. Recipient WTRUs may be notified of transmission time and frequency of group or groups they are to detect, as well as transmission power.

A WTRU that receives a timing signal may report to the base station. The reporting itself may be dependent on reception level or path loss (radio link quality) and/or reception of TS from a certain group. For example, received signals with a low power level or signals with a high path loss may not be reported to the base station. A threshold used for determining whether or not to report signals to the base station may be provided by the base station. Other thresholds, such as battery status, radio link quality with the base station, or the like, may also be used to avoid unnecessarily reporting to the base station. The reported information may include reception level or path loss (i.e., radio link quality), WTRU and/or group ID and time/frequency of the TS, and the like. To ensure that an appropriate threshold is used, the base station may instruct the WTRU to report all received signals, or statistics, (such as average and spread), derived from such signals, whether they exceed the threshold or not, such that the threshold may be adjusted if necessary.

Figure 7:
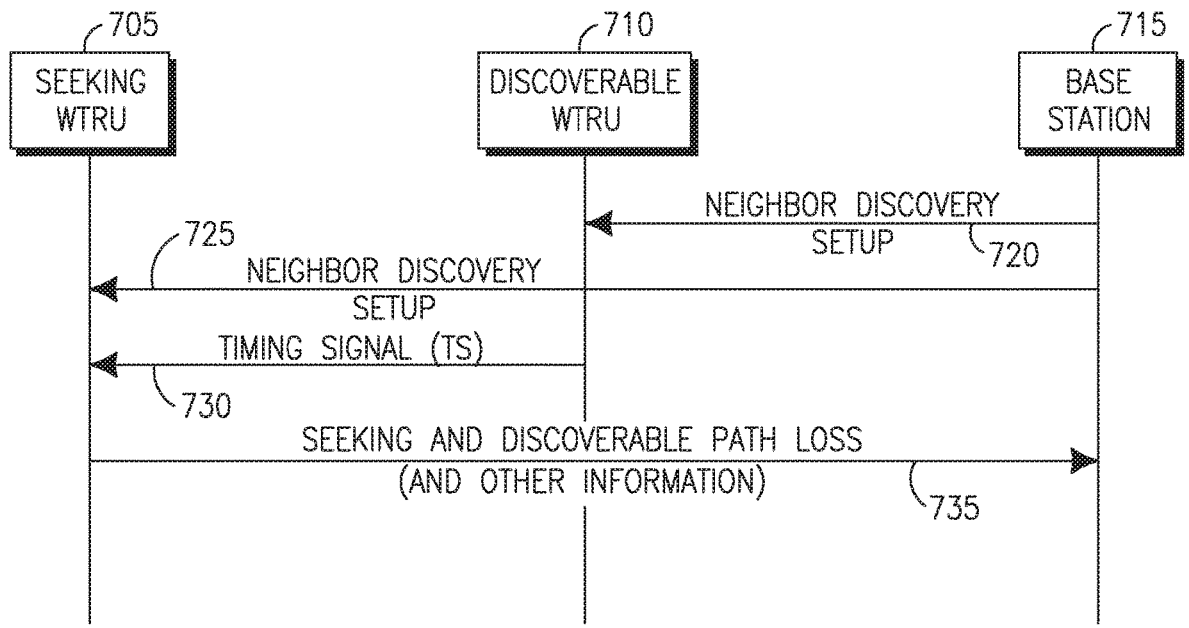
FIG. 7 shows an example procedure implemented when a seeking WTRU and a discoverable WTRU are under the control of a base station.

FIG. 7 shows an example procedure 700 implemented when a seeking WTRU 705 and a discoverable WTRU 710 are under the control of a base station 715. When the discovery is coordinated by the base station 715, one TS attempt may be enough because the seeking WTRU 705 may be informed whether the discoverable WTRU 710 is transmitting and both are synchronized.

In 720, a neighbor discovery setup procedure may be implemented by the base station 715 with the discoverable WTRU 710. In 725, a neighbor discovery setup procedure may be implemented by the base station 715 with the seeking WTRU 705. This may be implemented in unicast signaling from the base station 715 to a respective discoverable WTRU 710, or alternatively different groups of discoverable WTRUs 710 may be instructed by the base station 715 to take on different roles. In 730, the discoverable WTRU 710 may send a TS 730 to the seeking WTRU 705. In 735, the seeking WTRU 705 may send path loss (i.e., radio link quality) measurement information it has measured between the seeking WTRU 705 and the discoverable WTRU 710, and other information, such as the received code of the TS 730, and its timing relative to the base station 715.

Peer-to-peer communications with one out-of-coverage WTRU is described herein. While some protocols may need to change to accommodate this case, specific procedure for WTRU discovery may not be required. It may be necessary to separate the TS waveforms from the normal base station preambles. For example, this may be implemented by transmitting the TS in a frame that is not used by the base station.

If grouping is required at this point, then the TS may be composed of a PA-preamble and a SA-Preamble as shown in FIG. 4. Otherwise, the SA-preamble may be omitted. The power level may be signaled to both discoverable and seeking WTRUs. A seeking WTRU may check the grouping, compute path loss and create a report if particular criteria are met.

An access procedure when no infrastructure nodes are available is explained herein. This procedure is suitable for (but not limited to) PPDR mobile applications in cases where infrastructure nodes cannot be received by any WTRUs in an area. This procedure may be adapted to achieve the low access latency and the high rate of network entry.

An important consideration is the speed of creating a connection, (due to the fact that connections are created just prior to sending of data). A peer group for this scenario may be defined as the group of subscribers that may form sub-networks.

This procedure may maintain as many subscribers synchronized as desired, because even though communications in this scenario occurs in sub-networks, synchronizing sub-networks that exist in the same carrier and geographical area reduces interference in general and allows for more sophisticated interference management or reduction procedures, and synchronized devices may require shorter connection setup time.

The requirements for rapidly establishing a connection does not allow for many steps for the access. One of the means to shorten the required time to establish the connection is to avoid random access as much as possible. The procedure may use WTRU IDs.

In order to shorten connect time, devices on the network (whether connected or not) may be (receiver) synchronized and may transmit a time synchronization signal (e.g., TS). Subscribers in a peer group may transmit the same waveform at the same time. Different peer groups may transmit a different TS, either at the same or different times. A PA-preamble and SA-preamble may be used if grouping information is to be conveyed. Network entry parameters that are related to the SFH may be signaled by adding an SFH.

In accordance with one embodiment, WTRUs in the network that received the TS may modify it to a different TS (i.e., TS') and relay it at a different time. TS' may be mappable from the TS. The time difference may be known in advance. Relaying may be on a peer group basis and the groups may be predetermined.

The pair TS-TS' relationship is such that receiving one of them provides sufficient timing information and they may share the same ID. There are many ways by which the properties above may be achieved. One example is that TS' uses similar codes to TS and that the mapping of codes between TS and TS' is known.

In accordance with another example, a single type of TS may be used. A WTRU may alternate between receiving the TS and transmitting it. In order to regulate the transmitting and receiving, the decision may be left to the WTRU under the condition that synchronization (in time and frequency) may be maintained and that a certain fraction of the TS may be transmitted. Alternatively, the receive/transmit pattern may be predetermined.

A WTRU that needs to adjust its timing by a significant factor after reception of the TS may avoid transmitting it. This may effectively remove fast moving WTRUs from a relaying group and improve the overall network synchronization quality. As a result, WTRUs may be synchronized. If an SFH is used, then a network entry may follow that of a WTRU to a base station. A seeking WTRU that detects a discoverable WTRU that it wants to connect to may perform an unsynchronized ranging network entry to that discoverable WTRU. If an SFH is not used, then a simplified network access may take place.

Seeking WTRUs may attempt to indicate which discoverable WTRU(s) it may form a connection to. A seeking WTRU may start by sending a connection establishment signal (CES) to one or more discoverable WTRUs. The CES may include a sequence that indicates the seeking WTRU ID, such as an IEEE 802.16m SA-preamble, and an OFDM signal sent at known time/frequency resources. Those may be determined by the seeking WTRU ID. Alternatively, the OFDM signal may be transmitted on resources randomly selected out of a group of resources. At least one of the following information may also be included: seeking WTRU ID (may be necessary for random resources case), DL resources to be used for multicast (common) data, a list of discoverable WTRU IDs for each DL resources for individual part, UL resources for feedback (including bandwidth request), and UL resources for data (persistent allocation), or a transmit power used and estimate of received interference at the seeking WTRU. Instead of a single seeking WTRU ID, the message may include a group ID. In this case, UL resources may be provided for feedback and bandwidth request (BR).

Transmission power may be set high enough for a reasonable success rate. A discoverable WTRU that detects its ID responds via indicated resources. The initial transmit power may be determined by using parameters (transmit power, interference and own measured received signal level, and the like).

If the seeking WTRU does not receive a response from any indicated discoverable WTRUs, it may raise power and repeat the process, but may not need to repeat all recipients IDs.

Discoverable WTRUs and seeking WTRUs in this case may be determined by need, not by topology. WTRUs therefore may be discoverable if they transmit the necessary signals. However, two WTRUs may end up attempting to perform network entry into each other at the same time. This may be avoided by establishing a random wait time between the TS and the entry attempt.

IEEE 802.16m defines several UL and DL channels to be used for different purposes. These may be categorized by their physical characteristics and by their access mode (scheduled or contentious). Data channels may be used to transmit user data and medium access control (MAC) control messages. Data channels may be scheduled (persistently or per request), and contain user-specific quadrature amplitude modulation (QAM) data on predefined time/frequency (T/F) resources. Reference signals (pilot) may be embedded in other channels. Data and reference channels may not be considered useful for node discovery due to unavailable location or other information and the resulting difficulties in detection and high overhead to the node to be discovered. UL feedback channels may carry specific, predefined feedback information, which entail high overhead.

Ranging preambles (RPs) for non-synchronized WTRUs are designated by sub-frame and sub-band. Sub-bands may be determined by cell ID. Ranging preambles may be constructed off a Zadoff-Chu sequence with cyclic shifts. There may be up to 32 initial RP codes. Reception of this waveform assumes that it arrives within the OFDM symbol time (including cyclic prefix). For normal ranging, this may not be a problem as a WTRU may already be synchronized in DL prior to the sending of a ranging preamble.

Sounding channels may be allocated a single OFDM symbol, up to one per sub-frame and are constructed off a predefined Golay sequence. A WTRU may be instructed as to how to transmit a sounding signal. Sub-carriers are divided into sounding sub-bands, each 72 sub-carriers (for fast Fourier transform (FFT) of 512, 1025 and 2048) and up to 25 sub-bands. A WTRU may be instructed to transmit on any combination of these sub-bands, a maximum of 1728 sub-carriers.

Multiple WTRUs (or multiple antennas) may be multiplexed on the same sub-bands through frequency decimation or cyclic shift separation, in addition to time separation by assigning to different sub-frame. In cyclic shift separation, different offsets of the Golay sequence may be chosen. Thus, WTRUs may be separated by the autocorrelation property of the Golay sequence. In frequency decimation, different sub-carriers may be used for different WTRUs. Reception of this waveform may assume that it arrives within the OFDM symbol time (including cyclic prefix). For normal ranging, this is not a problem as a WTRU may already be synchronized in UL prior to sending of ranging preamble.

A DL preamble may include a primary advanced and secondary advanced preamble (PA-Preamble and SA-Preamble). The PA-Preamble occupies alternating sub-carrier in a single OFDM symbol and therefore may have a repetitive (2×) structure in the time domain which may be blindly detected with an autocorrelation detector and provide a timing reference. PA-Preamble may carry the information of system bandwidth. There may be a total of 11 distinct sequences, out of which 7 are currently "reserved."

The SA-preamble may be bandwidth dependent. A choice of sequence may indicate base station type (macro, Femto, relay, and the like) and cell ID. This may be accomplished by selection of order of sub sequences, sequences themselves are quadrature phase shift keying (QPSK) modulated. In case of multiple antennas, different subsequences may be sent through different antennas. SA-preamble reception may require timing information obtained from the PA-preamble.

Figure 8:
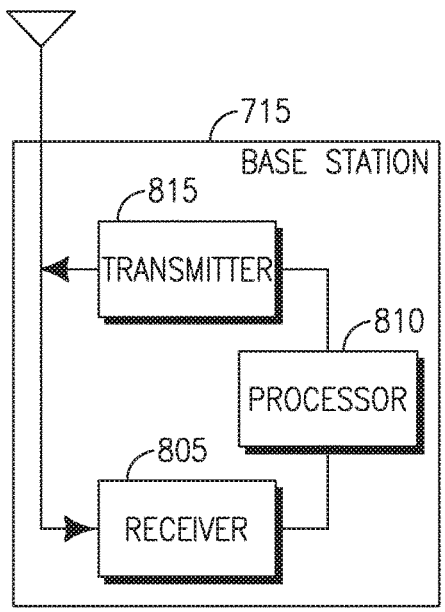
FIG. 8 is a block diagram of an example base station used to perform the procedure of FIG. 7.

FIG. 8 is a block diagram of an example base station 715 used to perform the procedure 700 of FIG. 7. The base station may include a receiver 805, a processor 810 and a transmitter 815.

The base station 715 may implement node discovery for peer-to-peer communication. The transmitter 815 may be configured to transmit a command signal instructing a discoverable WTRU to transmit a timing signal. The receiver 805 may be configured to receive a signal from a seeking WTRU that received the timing signal from the discoverable WTRU. The timing signal may include at least one of a primary preamble or a secondary preamble.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method implemented in a Wireless Transmit Receive Unit (WTRU) for peer-to-peer communications, the method comprising:
   receiving configuration information from a base station of a wireless network, the configuration information indicating a pattern of time resources for use in peer-to-peer communications;
   transmitting to at least one peer WTRU control information in at least one of the time resources in the pattern of time resources, wherein the control information includes a group identifier indicating a peer group comprising the at least one peer WTRU intended for receiving the control information and an indication of resources for transmission of peer data; and
   transmitting, to the at least one peer WTRU, peer data in the indicated resources for transmission of peer data.

2. The method of claim 1 wherein the control information comprises a primary advanced preamble.

3. The method of claim 1 wherein the control information comprises a secondary advanced preamble.

4. The method of claim 1 wherein the control information is transmitted periodically.

5. The method of claim 4 wherein the control information provides its own timing information.

6. The method of claim 1 further comprising:
   estimating a path loss to the at least one peer WTRU; and
   reporting the estimated path loss to a network.

7. The method of claim 6 wherein the path loss is estimated based on the handshake seeking signal.

8. The method of claim 1 wherein the control information further identifies the WTRU.

9. The method of claim 8 further comprising:
   transmitting access information.

10. The method of claim 9 further comprising: receiving a random access channel (RACH) transmission from the at least one peer WTRU.

11. The method of claim 10 further comprising:
    transmitting resource allocation to the other WTRU.

12. The method of claim 11 further comprising:
    receiving a transmission from the at least one peer WTRU including identities of the WTRU and the at least one peer WTRU.

13. The method of claim 1 wherein the WTRU increases a transmit power of the timing signal on a condition that no other subscriber station successfully receives the timing signal.

* * * * *